Sept. 24, 1957   T. A. CARLSON, JR   2,807,421
COMBINATION HOT WATER MIXER AND STEAM TRAP
Filed June 1, 1955
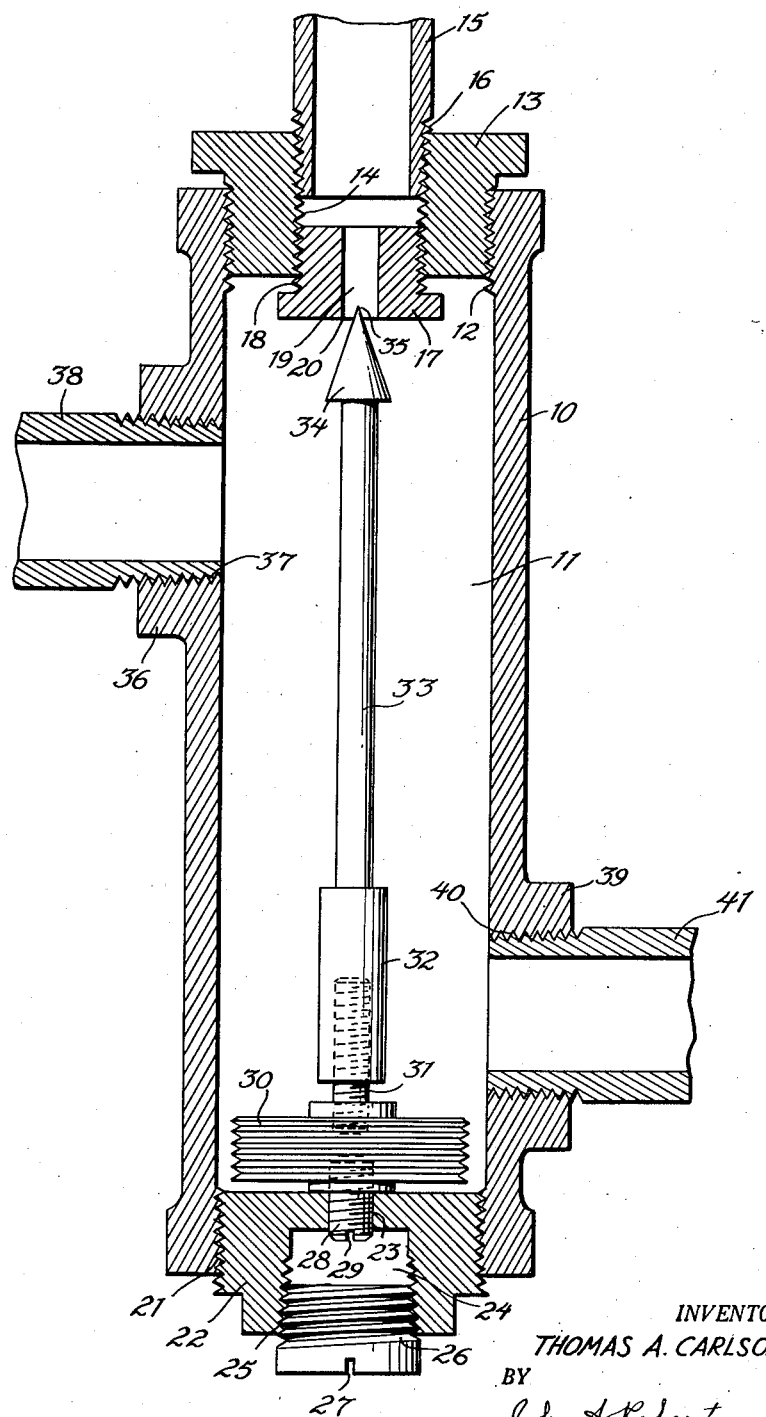
INVENTOR.
THOMAS A. CARLSON, JR.
BY
John A. Robertson
ATTORNEY.

United States Patent Office 2,807,421
Patented Sept. 24, 1957

2,807,421
COMBINATION HOT WATER MIXER AND STEAM TRAP

Thomas A. Carlson, Jr., Mount Royal, N. J.

Application June 1, 1955, Serial No. 512,556

2 Claims. (Cl. 236—12)

The present invention relates to steam traps and is concerned primarily with a device that is intended to function either as a steam trap or a hot water mixer.

At the present time, there are many places where there is need of an adequate supply of water under a desired pressure and at a proper temperature. This is particularly true in the scouring of floors of factories, garages, warehouses, and other places where the floor becomes dirty by the accumulation of grease and other materials that are hard to remove. As a general rule, the buildings which have need of this supply of hot water for cleansing purposes will also have a source of supply of steam under pressure.

With the foregoing conditions in mind, the present invention has in view as its foremost objective the provision of a device that is operative to mix steam with cold water so as to provide hot water for cleansing or other purposes.

It is important that the temperature of the hot water which is supplied be accurately controlled. Obviously, the temperature of the ultimate mixture depends directly upon the amount of steam which is mixed with the cold water. Accordingly, the invention has a further object the provision of a hot water mixer of the character indicated which includes temperature responsive means for automatically controlling the amount of steam which is admitted to the mixing chamber.

In carrying out the above-noted ideas in a practical embodiment, the device includes as an essential element a hollow cylindrical body which defines the mixing chamber. This body carries at one end a bushing which functions as a coupling for a steam line and also carries a valve seat member on its inner end. The opposite end of the body or casing is provided with a plug which carries a thermostat with the latter, in turn, being operatively connected to a rod which, at its free end, carries a conically shaped valve member that extends into the valve seat member. The casing is also provided with a cold water inlet and a discharge opening.

It is evident that the amount of steam which enters into the mixing chamber from the steam pipe depends directly on the relation of the conical valve member and valve seat member or, stating it in another way, the extent to which the conical valve is inserted into the valve seat member. This factor is directly controlled by the temperature of the mixture within the chamber. When this mixture reaches a predetermined temperature, the conical valve will fully close the opening in the valve seat member and thus, cut off the supply of steam. As the temperature of the mixture falls, the valve is again opened.

An important object of the invention is to provide a hot water mixer of the character above indicated which is adapted to have its cold water inlet closed by a plug whereby the device is adapted to function as a steam trap.

Still another object of the invention is to provide for an adjustment of the mounting of the thermostat on its supporting plug so that the hot water mixer may be adjusted to vary the temperature of the ultimate mixture. This end is accomplished by mounting the thermostat on a threaded stem that is screwed into the plug. The end face of this plug is formed with a recess providing access to the end of the threaded stem so that the latter may be rotated to adjust the position of the thermostat relative to the plug. This recess is normally closed by a removable auxiliary plug.

Still another object of the invention is to provide in a combination hot water mixer and steam trap of the character indicated, a valve seat member that is removable so that it may be replaced by other valve seat members having bores of different diameters.

Various other more detailed objects and advantages of the invention, such as arise in connection with carrying out the above-noted ideas in a practical embodiment, will in part become apparent and in part be hereinafter stated as the description of the invention proceeds.

The invention, therefore, comprises a combination hot water mixer and steam trap consisting, essentially, of a hollow body in the form of a cylindrical casing having a bushing in its upper end to which is connected a steam pipe with the bushing on its inner face carrying a removable valve seat member. The lower end of the casing is closed by a plug on which is adjustably supported a thermostat with a rod extending upwardly from the latter and carrying a conical valve which cooperates with the valve seat member. The casing is formed with a cold water inlet that is adapted to be closed by a plug to convert the device to a steam trap and with a discharge opening adjacent to its lower end.

For a full and more complete understanding of the invention, reference may be had to the following description and accompanying drawing wherein the figure is a longitudinal vertical section through a combination hot water mixer and steam trap designed in accordance with the precepts of this invention.

Referring now to the drawing, the combination hot water mixer and steam trap of this invention is shown as comprising a hollow body 10 which is preferably of wrought iron and of cylindrical formation. This body 10 defines a mixing chamber 11.

At the upper end, the cylindrical body 10 is interiorly threaded, as indicated at 12, and screwed into these threads 12 is a bushing 13. The bushing 13 has a threaded bore 14 extending entirely therethrough. A steam pipe is represented at 15 and has a threaded end portion 16. This threaded portion is screwed into the outer end of the threaded bore 14. A valve seat member 17 is exteriorly threaded, as indicated at 18, and is screwed into the end of the threaded bore 14, with the threaded connection being adjustable to permit variations in the position of the valve-seat member 17 relative to the bushing 13. This valve seat member 17 has an axial passage 19 which terminates on the inner face in a valve seat 20.

The lower end of the body 10 is also interiorly threaded, as indicated at 21. Screwed into these threads 21 is a plug 22. The plug 22 is formed with a threaded passage 23 that terminates in a counterbore or recess 24. The latter is interiorly threaded, as indicated at 25, and screwed into these threads 25 is an auxiliary plug 26 having tool engaging means in the form of a slot 27.

A screw stem 28 is screwed into the threaded passage 23, and at its lower or exposed end is formed with tool engaging means in the form of a slot 29. Mounted on the upper end of the stem 23 is a bellows-type thermostat 30. Extending upwardly from the upper end face of the thermostat 30 is a threaded rod 31. Screwed onto this rod 31 is a sleeve 32. Carried by this sleeve 32 is a rod 33, the upper free end of which is formed as a conically shaped valve member 34, the point 35 of which extends into the passage 19.

Adjacent to its upper end, the casing 10 is formed with a boss 36 having a threaded inlet passage 37. These threads 37 are adapted to receive either the threaded end of a cold water pipe, as depicted at 38, or a plug for closing the cold water inlet.

Adjacent to its lower end, the casing 10 is formed with another boss 39 through which extends a discharge opening 40 with the walls of the latter threaded, as illustrated. A discharge pipe 41 is screwed into the threaded opening 40.

*Operation*

While the mode of operation of the combination hot water mixer and steam trap is believed to be obvious from the illustration of the drawing and description of parts given, it may be briefly outlined as follows:

The pipe 38 extends to a source of supply of cold water while the pipe 15 extends to a source of supply of steam under pressure. The auxiliary plug 26 may be removed to obtain access to the slot 29 in the end of the screw stem 28 so that the thermostat 30 is adjusted relative to the plug 22 after which the auxiliary plug is replaced.

Steam from the pipe 15 and cold water from the pipe 38 enter the mixing chamber 11 and are thoroughly intermixed. This, of course, raiser the temperature of the water, and the hot water passes through the discharge pipe 41. As the temperature of the mixture rises, the thermostat 30 is affected to raise the rod 33 and valve member 34 carried thereby so that the latter is inserted into the passage 19 to restrict the effective area of the valve seat 20. As this area is restricted, the amount of steam which is admitted is reduced. This action is continued until the valve member 34 completely closes the passage 19 and cuts off the supply of steam.

As the temperature falls, the thermostat 30 contracts and withdraws the valve member 34 to open the valve seat 20.

When it is desired to use the device as a steam trap alone, the cold water pipe 38 is removed and replaced by a plug. The steam trap functions in the manner substantially the same as that above described. That is when the steam in the chamber 11 is of a predetermined temperature, the thermostat 30 causes the valve 34 to close the valve seat 20.

While a preferred specific embodiment of the invention is hereinbefore set forth, it is to be clearly understood that the invention is not to be limited to the exact constructions, mechanisms, and devices illustrated and described, because various modifications of these details may be provided in putting the invention into practice within the purview of the appended claims.

What is claimed is:

1. In a hot water mixer, a cylindrical casing intended to be verically positioned and having a bore providing a mixing chamber, said casing being internally threaded at the opposite ends of said bore, an externally threaded bushing screwed into the upper end of said casing and having a threaded bore substantially coaxial with the bore of said casing, the outer end portion of the threaded bore of said bushing being adapted to have a steampipe connected thereto, an externally threaded valve-seat member screwed into the inner end of the bore of said bushing whereby it is removably mounted and longitudinally adjustable, said valve-seat member having a longitudinal passage coaxial with the bore of said casing the inner end of which constitutes a valve seat, an externally threaded plug screwed into the lower end of said casing, a vertically disposed bellows-type thermostat adjustably mounted on said plug, a vertical rod within said casing and centrally arranged in spaced relation with respect to the bore of said casing, said rod having its lower end operatively connected to said thermostat to be moved thereby, and a pointed conical valve member at the upper end of said rod and extending into the inner end of said passage whereby lateral displacement of the upper end of said rod is limited and the effective area of the opening defined by said valve seat is varied by movement of said rod, said casing being formed with a cold-water inlet adjacent to the top thereof and a discharge opening adjacent to the bottom thereof.

2. In a hot water mixer, a cylindrical casing intended to be vertically positioned and having a bore providing a mixing chamber, said casing being internally threaded at the opposite ends of said bore, an externally threaded bushing screwed into the upper end of said casing and having a threaded bore substantially coaxial with the bore of said casing, the outer end portion of the threaded bore of said bushing being adapted to have a steampipe connected thereto, an externally threaded valve-seat member screwed into the inner end of the bore of said bushing whereby it is removably mounted and longitudinally adjustable, said valve-seat member having a longitudinal passage coaxial with the bore of said casing the inner end of which constitutes a valve seat, an externally threaded plug screwed into the lower end of said casing and having a central threaded aperture and a threaded counterbore, an externally threaded auxiliary plug screwed into said counterbore, a threaded stem screwed into said aperture and having an end accessible from said counterbore formed with tool-engaging means, a vertically disposed bellows-type thermostat carried by said stem, a vertical rod within said casing and centrally arranged in spaced relation with respect to the bore of said casing, said rod having its lower end operatively connected to said thermostat to be moved thereby, and a pointed conical valve member at the upper end of said rod and extending into the inner end of said passage whereby lateral displacement of the upper end of said rod is limited and the effective area of the opening defined by said valve seat is varied by movement of said rod, said casing being formed with a cold-water inlet adjacent to the top thereof and a discharge opening adjacent to the bottom thereof.

References Cited in the file of this patent

UNITED STATES PATENTS

| 2,141,520 | Dube | Dec. 27, 1938 |
| 2,296,128 | Weingarten | Sept. 15, 1942 |
| 2,335,250 | Adlam | Nov. 30, 1943 |
| 2,539,280 | Smith | Jan. 23, 1951 |

FOREIGN PATENTS

| 282,269 | Germany | Feb. 22, 1915 |
| 352,345 | Germany | Apr. 25, 1922 |